United States Patent [19]

Groeger

[11] Patent Number: 5,662,728
[45] Date of Patent: Sep. 2, 1997

[54] PARTICULATE FILTER STRUCTURE

[75] Inventor: Herbert Gunter Groeger, Charlotte, N.C.

[73] Assignee: Hoechst Celanese Corporation, Somerville, N.J.

[21] Appl. No.: 999,029

[22] Filed: Dec. 31, 1992

[51] Int. Cl.$^6$ .................... B01D 50/00; B01D 53/02
[52] U.S. Cl. ................... 96/153; 55/524; 55/528; 96/154; 428/323; 442/168; 442/359; 442/364
[58] Field of Search ................ 96/153, 154; 55/524, 55/527, 514, 494, 528; 428/198, 283, 288, 296, 302, 323

[56] References Cited

U.S. PATENT DOCUMENTS

| | | | |
|---|---|---|---|
| 3,015,367 | 1/1962 | Smith et al. | 96/135 |
| 3,998,988 | 12/1976 | Shimomai et al. | 428/400 |
| 4,160,059 | 7/1979 | Samejima | 55/524 |
| 4,429,001 | 1/1984 | Kolpin et al. | 96/153 |
| 4,433,024 | 2/1984 | Eian | 428/198 |
| 4,495,030 | 1/1985 | Giglia | 55/527 |
| 4,540,625 | 9/1985 | Sherwood | 55/524 |
| 4,554,198 | 11/1985 | von Blücher et al. | 428/143 |
| 4,565,727 | 1/1986 | Giglia et al. | 428/172 |
| 4,681,801 | 7/1987 | Eian et al. | 428/283 |
| 4,729,371 | 3/1988 | Krueger et al. | 428/296 |
| 4,732,809 | 3/1988 | Harris, Jr. et al. | 428/296 |
| 4,765,812 | 8/1988 | Homonoff et al. | 55/524 |
| 4,795,668 | 1/1989 | Krueger et al. | 428/174 |
| 4,868,032 | 9/1989 | Eian et al. | 428/198 |
| 4,872,220 | 10/1989 | Haruvy et al. | 2/243.1 |
| 4,889,764 | 12/1989 | Chenoweth et al. | 428/283 |
| 4,904,343 | 2/1990 | Giglia et al. | 428/283 |
| 4,917,714 | 4/1990 | Kinsley et al. | 55/527 |
| 4,950,541 | 8/1990 | Tabor et al. | 428/373 |
| 4,963,431 | 10/1990 | Goldstein et al. | 428/288 |
| 4,966,809 | 10/1990 | Tanaka et al. | 428/323 |
| 4,970,111 | 11/1990 | Smith, Jr. | 428/283 |
| 4,981,501 | 1/1991 | Blücher et al. | 96/153 |
| 4,983,192 | 1/1991 | von Blücher et al. | 502/402 |
| 4,992,084 | 2/1991 | Blücher et al. | 96/131 |
| 5,077,116 | 12/1991 | Lefkowitz | 428/141 |
| 5,082,720 | 1/1992 | Hayes | 428/224 |
| 5,221,573 | 6/1993 | Baigas, Jr. | 55/524 |
| 5,328,758 | 7/1994 | Markell et al. | 96/154 |
| 5,393,601 | 2/1995 | Heinrich et al. | 428/288 |
| 5,486,410 | 1/1996 | Groeger et al. | 428/283 |

FOREIGN PATENT DOCUMENTS

| | | | |
|---|---|---|---|
| 0 156 649 | 10/1985 | European Pat. Off. | |
| 0 257 868 | 3/1988 | European Pat. Off. | |
| 2 120 871 | 8/1972 | France | |
| 51-98689 | 8/1976 | Japan | 96/154 |
| WO-A-85 03013 | 7/1985 | WIPO | |
| WO-A-93 01880 | 2/1993 | WIPO | |
| WO-A-94 11556 | 5/1994 | WIPO | |

*Primary Examiner*—Jay H. Woo
*Assistant Examiner*—Duane S. Smith
*Attorney, Agent, or Firm*—T. R. Kroboth

[57] ABSTRACT

A particulate filter structure and method for making the structure are disclosed. The structure includes a stable framework of relatively large denier fibers having a lower melting component and a higher melting component. The larger denier fibers have a denier of from about 30 dpf or more and are bonded by the lower melting component at the crossover points. Smaller denier fibers, which preferably are of the same composition as the larger denier fibers are immobilized onto the framework formed by the larger denier fibers by applying heat. Functional particulate such as activated carbon is immobilized primarily onto the smaller denier fibers, also by application of heat.

16 Claims, 1 Drawing Sheet

PARTICULATE FILTER STRUCTURE

FIELD OF THE INVENTION

This invention relates to dimensionally stable filter structures formed from thermoplastic fibers, and in particular to such filter structures having functional particulate matter incorporated therein.

BACKGROUND OF THE INVENTION

Filter structures formed from thermoplastic fibers and having a functional particulate matter incorporated therein may be used for a variety of purposes. Such filter structures containing activated carbon have been used to adsorb noxious or harmful gases. Other activated particulates may be used depending on the function of the filter. For example, a biocide may be incorporated into a thermoplastic filter structure for the destruction of microbes passing through the filter. The variety of particulate matter and the functions associated therewith are extensively documented and are too extensive to list individually herein.

Examples of activated carbon filters for gas masks are disclosed in U.S. Pat. Nos. 4,981,501 and 4,992,084. These patents disclose a three dimensional carrier framework for activated carbon particles having a diameter from 0.1 to 1 mm. The carrier framework is said to be composed of wires, monofilaments or stays, the distance between the components being at least twice as great as the diameter of the adsorbent particles. A large pore reticulated polyurethane foam is specifically disclosed as a carrier framework for granular adsorbent particles. These patents also disclose that the adsorbent particles can be affixed to heterofilic fibers having two coaxially arranged components wherein one component has a lower melting point than the other. However, no method for preparing a dimensionally stable carrier framework from such heterofilic fibers is disclosed.

It would be desirable to provide a dimensionally stable filter structure from thermoplastic fibers and an active particulate matter in which the carrier framework for the structure also carries a fibrous filter material in addition to the particulate filter material. Such a filter structure could provide greater surface area for attachment of particulate matter.

SUMMARY OF THE INVENTION

This invention relates to a particulate filter structure having a high degree of dimensional stability and including a stable three dimensional framework of relatively larger denier composite fibers, thermoplastic fibers of relatively smaller denier dispersed throughout and bonded to the framework, and an active particulate matter distributed within the fibrous framework and entrapped in interstices and bonded to at least the smaller denier thermoplastic fibers. The larger denier fibers maintain the stability and permeability of the filter structure, which filter structure substantially is formed of the smaller denier fibers and the particulate matter. The structural fibers comprise about ten percent of less of the total weight of the filter structure. The larger denier fibers should have a denier of at least about 30 dpf and should comprise a relatively higher melting component and a relatively lower melting component. The lower melting component bonds the fibers of the framework at the cross-over points. The smaller denier fibers should have a denier of less than about 30 dpf and are dispersed throughout and bonded to the framework to immobilize the thermoplastic fibers and to provide a surface for attachment of active particulate matter. The active particulate matter is bonded to at least the smaller denier thermoplastic fibers.

In a more specific embodiment, the small and large denier fibers are formed of the same material and are sheath/core heterofilament fibers having a NYLON (polyamide) sheath and a polyester core. A filter structure formed from such larger and smaller denier heterofilaments can be made having a thickness of from about 1.0 mm to 250 mm. The particulate matter can have a nominal particle diameter from 0.1 micron to 5 mm depending on the selection of the framework composite fibers and the smaller denier thermoplastic fibers.

The method for preparing such a particulate filter structure comprises preparing a framework of the relatively larger denier composite fibers having a denier of 30 dpf or greater, and thermally bonding these fibers at the cross-over points. Smaller denier thermoplastic fibers are dispersed into the framework and these fibers have a denier of less than about 30. The smaller denier fibers are immobilized onto the framework and a particulate matter is dispersed onto the framework and thermally bonded to at least the smaller denier fibers.

The smaller denier fibers can be dispersed into the framework by hydro-entanglement or air-entanglement or some other suitable method. Alternatively, a web of relatively small denier thermoplastic fibers can be formed and larger denier fibers can be integrated into the smaller denier web to provide dimensional stability.

In another specific method, a slurry of large and small denier fibers is placed into a mold and the solvent is removed to form a filter structure. Activated particulate matter may be included in the slurry or may be added after the filter structure is formed.

DETAILED DESCRIPTION OF THE PREFERRED EMBODIMENTS

Figure 1:
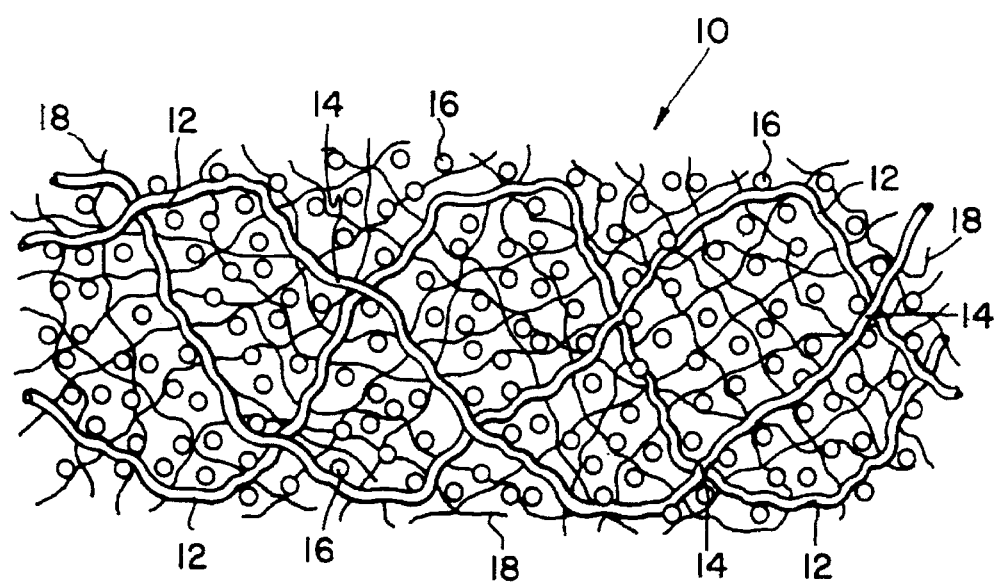
FIG. 1 is a representation of a cross-section through a filter structure of the present invention.

FIG. 1 illustrates broadly at 10 a representation of a cross-section through a portion of the filter structure of the invention claimed herein. The filter structure includes a stable framework of relatively larger denier composite structural fibers 12 that are thermally bonded at the cross-over points 14. By the term "structural fibers" is meant fibers of relatively larger denier that may be used to support a filter or fabric structure. These structural fibers have a denier of at least about 30 dpf.

The structural fibers may range in denier from about 30 dpf to 10,000 dpf or larger depending on the stiffness desired for providing a framework that is resistant to compression and is otherwise dimensionally stable and the size of the functional particulate 16 that is chosen. The composite fibers should be present in an amount sufficient to provide a structure to which may be bonded the relatively smaller denier fibers 18.

The composite fibers 12 have a higher melting component and a lower melting component. The higher melting component has a melting point at least about 20° C. higher than the relatively lower melting component. When heated above the melting point of the lower melting component, but below the melting point of the higher melting component, the lower melting component bonds the fibers of the framework together without affecting the structural integrity of the framework that is provided by the higher melting component.

Composite fibers suitable for use as structural fibers in the practice of the invention include bi-component fibers in which the higher and lower melting components are arranged in a side-by-side relationship, or heterofilament fibers having either a concentric or eccentric sheath/core arrangement with the high melting component forming the core and the lower melting component forming the sheath. The term "heterofilaments" as used herein refers to both staple fiber and to continuous filament, unless otherwise specified. The term "fiber" as used herein also refers to both cut staple and to continuous filament, unless otherwise specified. In side-by-side fibers the two components, one higher melting and one lower melting, are simultaneously extruded through single orifice to form a fiber having two halves. In the concentric sheath/core arrangement, a higher melting component forms a core centered axially within a lower melting sheath. In the eccentric sheath/core arrangement, the higher melting component is not centered axially of the fiber. Composite fibers are also sometimes referred to as bicomponent fibers.

Composite fibers having a lower melting polyamide component and a higher melting polyester component have a beneficial application in the practice of the invention. For example, a sheath/core heterofilament (FIG. 2) having a nylon sheath with a melting point from about 175°–185° C. and a polyester core with a melting point of from about 240°–256° C. has a beneficial use in the practice of the present invention.

Figure 2:
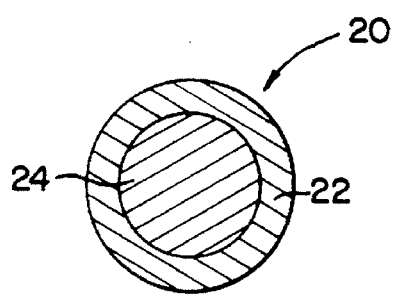
FIG. 2 is a representation of a cross-section through a representative thermoplastic fiber of the present invention.

FIG. 2 is a representation of a cross-section through a heterofilament 20. Heterofilament fiber 20 is representative of the many types of composite manufactured fibers that may be used for the framework or for attachment of the active particulate of the filter structure shown at 10 in FIG. 1.

Fiber 20 is illustrated as a concentric sheath-core heterofilament fiber in which the sheath and the core each comprise about 50% of the cross-sectional area of the fiber. A range of area of the fiber occupied by the sheath is contemplated to be from about 20 to about 80%. The fiber has a lower melting nylon sheath 22 and a higher melting polyester core 24. The sheath should have a melting point that is at least about 20° C. below the melting point of the core and should occupy about half the cross-section of the fiber to provide strong thermal bonding of the fiber structure without adversely affecting the integrity of the core. The core provides strength and integrity to the filter structure.

The framework of relatively large denier structural fibers 12 of the filter structure of the invention all include composite manufactured fibers as described above, having a lower melting component for thermal bonding of the structure at cross over points 14 and for immobilizing relatively smaller denier fibers 18. The skilled artisan should recognize that there are a wide variety of composite fibers having a higher melting component and a lower melting component that are suitable for the practice of the invention and that a heterofilament fiber having a polyamide sheath and a polyester core is but one of the broad array of fibers available. The composite fibers 12 may also be in a wide variety of forms including crimped and non-crimped cut staple fibers, short cut staple, continuous filaments or blends thereof.

Smaller denier thermoplastic fibers 18 of the filter structure 10 are immobilized on the framework of larger denier fibers and provide, in addition to the particulate matter, active filtration of liquids and gases. These smaller denier fibers also greatly increase the surface available for immobilizing the functional particulates. These smaller denier fibers can range in denier from about 1 to 30 dpf. Smaller denier staple fibers and short cut staple are particularly useful in the filter structure of the invention, although continuous filaments are also contemplated. Fibers 18 should be present in an amount sufficient to immobilize the particulate matter and to provide a desired filtration at an acceptable pressure drop across the filter.

The smaller denier thermoplastic fibers can be immobilized in the framework of larger denier fibers through the application of heat. Care should be exercised to avoid fusing the smaller fibers into a mass that could adversely impact pressure drop across the filter or otherwise reduce filter efficiency. Useful in the practice of the invention will be smaller denier fibers that have the same components as the composite structural fibers forming the framework.

For example, if sheath/core heterofilaments of nylon and polyester are used to form the framework, then it is useful for bonding the structure and for immobilizing the smaller diameter fibers and the particulate matter if the smaller denier fibers are also sheath/core heterofilaments of polyamide and polyester having similar melting points. This similarity in melting points simplifies bonding of the filter framework, bonding of the smaller diameter fibers to the framework, and bonding of the particulate matter to the filter structure. Bonding and immobilization of the smaller denier fiber to the larger denier fiber, and fusing of the particulate matter to the larger and smaller denier fibers, is much the same as described herein above with respect to the bonding the larger denier composite fibers to form a framework.

Figure 3:
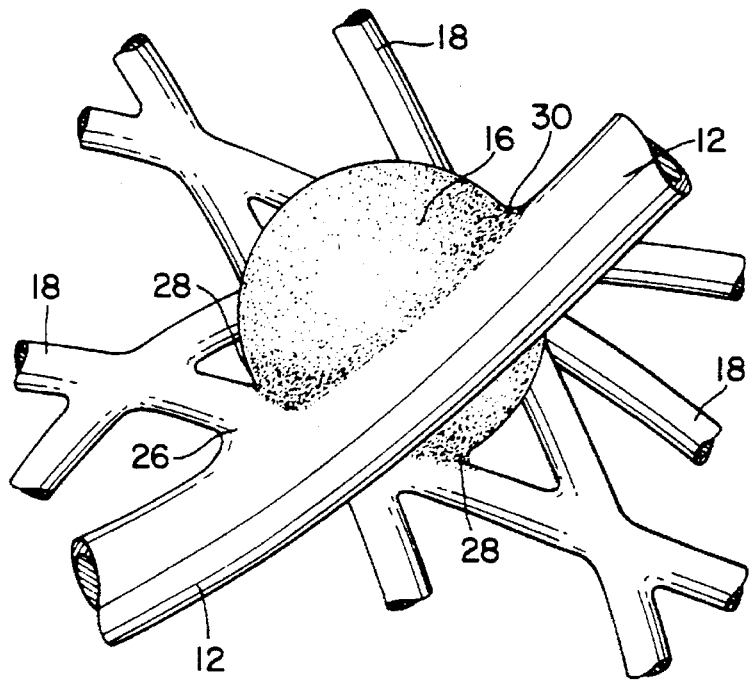
FIG. 3 is a representation of a portion of the filter structure of FIG. 1 showing bonding of the fibers in the filter structure and bonding the particulate matter to the fibers of the filter structure.

FIG. 3 is a greatly enlarged representation of particulate matter 16 immobilized within a framework of larger denier and smaller denier fibers 12 and be, respectively. The smaller denier fibers are immobilized on the framework of larger denier fibers at numerous points 26. The particles are fused primarily to the smaller denier fibers at numerous points 28, and may also be bonded to the larger denier fibers as shown at 30. As can be seen from FIG. 3, the filter structure is a cage-like structure in which particulate matter may be entrapped and substantially precluded from migrating. Fusing of the particle to the individual fibers desirably is localized in that the fiber does not form a film over the particle or otherwise substantially reduce the surface area of the particle available for contact with a liquid or gas stream moving through the filter structure.

The particulate matter may be selected from a wide variety of substances having some function that is desirably incorporated into a fibrous structure. One of the most common is activated carbon. Other types of functional particulate matter includes silica, zeolite, molecular sieve, clay, alumina, ion exchange resin, organic metal catalyst, metal oxide, biocide, fungicide, and virucide. For example, a fungitide particulate matter may be incorporated into a filter structure such as for an automobile climate control system to remove mildew and mildew odors from the circulated air. Biocides and virucides may be incorporated into filters for protection against microbial components. Particulate sizes may range from a small size of 0.1 micron for biocides and fungicides to 3 to 5 mm for other types of particulate matter, and vary in shape from irregular to circular cylinders up to about 50 mm in length. The foregoing list is intended to be representative of the wide variety of functional particulate matter available and not in limitation of the substances suitable for use in the practice of the present invention.

The filter structures of the present invention may be produced by a variety of processes. For example, a slurry of the larger denier fibers and smaller denier fibers may be formed in a solvent of water, acetone or other suitable hydrocarbon and placed into a mold. Particulate matter may or may not be included in the slurry, as desired. The liquid component of the slurry is removed, typically by vacuum, and through-air heat may be applied to dry the filter structure. If particulate matter was present in the slurry, then heat may also be applied to bond the filter structure and to bond particulate matter to the fibers. Otherwise, the particulate matter is then distributed into the dried structure. Activated carbon beads can be heated prior to application so that localized bonding takes place on contact with the fibers of the filter structure. The fibers of the filter structure are thereafter bonded. Alternatively, the particulate matter may be distributed cold and the entire structure and particulate bonded in one step.

For example, activated carbon beads may be fused to individual concentric sheath/core fibers of the filter structure of the invention by heating the particles above the melting point of the low melting sheath component of the fiber and then dispersing the particles into the filter structure. Activated carbon can also be applied cold and then heated for immobilization within the filter structure. Activated carbon particles and other inorganic oxides and hydrates have significantly lower specific heats than polymers and so heat quickly and result in localized fluidity of the polymer. A "spot weld" is produced with a thin, controlled layer of adhesive provided by the polymer that minimizes loss of surface area of the particle.

The filter structure of the invention can also be formed using dry forming methods such as carding or air laying of staple fibers or forming a web of continuous filaments. A web of the relatively larger denier fibers can be formed first and the smaller denier fibers and particulate matter dispersed therein and immobilized. Alternatively, a web of the relatively smaller denier fibers can be formed and the larger denier fibers thereafter integrated into the web. Particulate matter can be applied and immobilized either before or after the larger denier fibers are integrated into the web to form the filter structure of the web. Also, the web can be formed from the relatively smaller denier fibers and the relatively larger denier fibers together, and particulate matter can be applied and immobilized either during or after the formation of the web.

The particulate matter may be applied to the web from scatter coaters, engraved rolls, or screen conveyors. An inclined ramp may The particulate matter may be applied to the web from scatter coaters, engraved rolls, or screen conveyors. An inclined ramp may be used to spread the particulate matter and to enmesh the particulate matter within the web. Suitable methods for distributing particulate matter into a web are described in applicant's copending U.S. patent application U.S.S.N 07/977995 filed Nov. 18, 1992, abandoned.

The invention has been described with reference to particular preferred embodiments as illustrated in the drawing. However, these embodiments should be considered illustrative of and not in limitation of the invention claimed herein. On the contrary, the invention includes all alternatives, modifications, and equivalents that may be included within the scope and spirit of the invention as defined by the appended claims.

What is claimed is:

1. A particulate filter structure comprising a thermally bonded, three dimensional, fibrous framework comprising composite structural fibers having a denier of at least 30 dpf and comprising a structural component and a first lower melting component, said first lower melting component bonding said fibrous framework together at the cross over points; composite filtration fibers of relatively smaller denier than said structural fibers distributed within and bonded to said fibrous framework and comprising a higher melting component and a second lower melting component, wherein said filtration fibers have a denier of from about 1 to 30 dpf; and functional particulate distributed within said fibrous framework and entrapped in interstices formed by said filtration fibers and bonded by said second lower melting component to said filtration fibers; wherein said structural fibers comprise up to about 10 percent of the total weight of said particulate filter structure.

2. The filter structure of claim 1, wherein said structural fibers and said filtration fibers are crimped staple fibers.

3. The filter structure of claim 1, wherein said first lower melting component is a polyamide that melts at a temperature of from about 175° to 185° C.

4. The filter structure of claim 1, wherein said structural fibers have a denier of from about 30 to 10,000 dpf.

5. The filter structure of claim 1, wherein said particulate is bonded by said first lower melting component to said structural fibers and said filter structure substantially is formed of said filtration fibers and said functional particulate.

6. The filter structure of claim 1, wherein said second lower melting component is a polyamide that melts at a temperature of from about 175° to 185° C.

7. The filter structure of claim 1, wherein said structural fibers are sheath/core heterofilament fibers comprising a polyamide sheath that melts at a temperature of from about 175° to 185° C. as said first lower melting component, and a polyester core as said structural component, and wherein said filtration fibers are sheath/core heterofilament fibers comprising a polyamide sheath that melts at a temperature of from about 175° to 185° C. as said second lower melting component, and a polyester core as said higher melting component.

8. The fibrous structure of claim 1, wherein said structural component and said first lower melting component differ in melting point by at least 20° C., and said higher melting component and said second lower melting component differ in melting point by at least 20° C.

9. The filter structure of claim 1, wherein said functional particulate is selected from the group consisting of activated carbon, silica, zeolite, molecular sieve, clay, alumina, ion exchange resin, organic metal catalyst, metal oxide, biocide, fungicide and virucide.

10. The filter structure of claim 1, wherein said functional particulate is activated carbon.

11. A particulate filter structure comprising a thermally bonded, three dimensional, fibrous framework comprising crimped composite structural fibers having a denier of from about 30 to 10,000 dpf and comprising a structural component and a first lower melting component, said first lower melting component bonding said fibrous framework together at the cross over points; crimped composite filtration fibers of relatively smaller denier than said structural fibers distributed within and bonded to said fibrous framework and comprising a higher melting component and a second lower melting component, wherein said filtration fibers have a denier of from about 1 to 30 dpf, and said first lower melting component and said second lower melting component are the same polymer and have similar melting points; and functional particulate distributed within said fibrous framework and entrapped in interstices formed by said filtration fibers, and bonded to said fibrous framework by said first lower melting component and to said filtration fibers by said second lower melting component; wherein said structural fibers comprise up to about 10 percent of the total weight of said filter structure and said filter structure substantially is formed of said filtration fibers and said functional particulate.

12. The filter structure of claim 11, wherein said structural fibers are sheath/core heterofilament fibers comprising a polyamide sheath that melts at a temperature of from about 175° to 185° C. as said first lower melting component, and a polyester core as said structural component, and wherein said filtration fibers are sheath/core heterofilament fibers comprising a polyester core as said higher melting component.

13. The fibrous structure of claim 11, wherein said structural component and said first lower melting component differ in melting point by at least 20° C.

14. The filter structure of claim 11, wherein said functional particulate is activated carbon.

15. The filter structure of claim 1, wherein said filter structure has a thickness from about 1.0 mm to 250 mm.

16. The filter structure of claim 11, wherein said filter structure has a thickness from about 1.0 mm to 250 mm.

* * * * *